(12) United States Patent  (10) Patent No.: US 8,316,983 B2
Shirao  (45) Date of Patent: Nov. 27, 2012

(54) CONSTRUCTION VEHICLE

(75) Inventor: Atsushi Shirao, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/203,775

(22) PCT Filed: Mar. 12, 2010

(86) PCT No.: PCT/JP2010/054248
§ 371 (c)(1),
(2), (4) Date: Aug. 29, 2011

(87) PCT Pub. No.: WO2010/116853
PCT Pub. Date: Oct. 14, 2010

(65) Prior Publication Data
US 2011/0308878 A1 Dec. 22, 2011

(30) Foreign Application Priority Data
Apr. 9, 2009 (JP) ................................ 2009-094690

(51) Int. Cl.
B60K 17/00 (2006.01)

(52) U.S. Cl. ......................................... 180/305; 701/84

(58) Field of Classification Search .................. 180/170, 180/197, 305–308; 701/54, 58, 68, 84; 60/329
See application file for complete search history.

(56) References Cited

U.S. PATENT DOCUMENTS

| 4,523,564 A * | 6/1985 | Sturdy ........................... 123/361 |
| 4,763,262 A * | 8/1988 | Leiber ............................ 701/90 |
| 5,989,154 A * | 11/1999 | Christensen et al. ......... 477/111 |
| 6,052,644 A * | 4/2000 | Murakami et al. .............. 701/93 |
| 6,095,942 A * | 8/2000 | Yamaguchi et al. ............ 477/40 |
| 6,188,946 B1 * | 2/2001 | Suzuki et al. ................... 701/62 |
| 6,306,063 B1 * | 10/2001 | Horgan et al. ................. 477/108 |
| 6,938,719 B2 * | 9/2005 | Ishimaru et al. .............. 180/305 |
| 7,661,499 B2 * | 2/2010 | Matsuyama ................... 180/174 |
| 7,672,771 B2 * | 3/2010 | Nakanishi et al. .............. 701/70 |
| 7,987,941 B2 * | 8/2011 | Shirao et al. .................. 180/307 |
| 2004/0211614 A1 | 10/2004 | Matsuyama |
| 2008/0093145 A1 | 4/2008 | Matsuyama |
| 2011/0308878 A1 * | 12/2011 | Shirao ........................... 180/305 |

FOREIGN PATENT DOCUMENTS

| JP | 10-151965 A | 6/1998 |
| JP | 11-230333 A | 8/1999 |
| JP | 2004-144254 A | 5/2004 |
| JP | 2004-190615 A | 7/2004 |
| JP | 2006-090384 A | 4/2006 |
| WO | WO-2006/062018 A1 | 6/2006 |

* cited by examiner

Primary Examiner — John Walters
Assistant Examiner — James Triggs
(74) Attorney, Agent, or Firm — Global IP Counselors

(57) ABSTRACT

A construction vehicle includes a hydraulic pump for travelling driven by an engine and a hydraulic motor for travelling driven by a pressurized oil discharged from the hydraulic pump. A control unit is configured to set an upper limit of a command value of an acceleration opening degree in accordance with a magnitude of a travelling load and a magnitude of a vehicle speed, and to set a lower limit of a displacement of the hydraulic motor for travelling in order to maximize the vehicle speed at the acceleration opening degree limited to a predetermined amount.

9 Claims, 10 Drawing Sheets (a)

(b)

CONSTRUCTION VEHICLE

CROSS-REFERENCE TO RELATED APPLICATIONS

This national phase application claims priority to Japanese Patent Application No. 2009-094690 filed on Apr. 9, 2009. The entire disclosure of Japanese Patent Application No. 2009-094690 is hereby incorporated herein by reference.

TECHNICAL FIELD

The present invention relates to an HST-type construction vehicle configured to travel by driving a hydraulic motor for travelling by means of the pressurized oil discharged from a hydraulic pump to be driven by an engine.

BACKGROUND ART

Some construction vehicles such as the wheel loaders include so-called an HST (Hydro-Static Transmission). In travelling, the HST is configured to cause an engine to drive a hydraulic pump and drive a hydraulic motor for travelling (hereinafter referred to as the travelling hydraulic motor) by means of the pressurized oil discharged from the hydraulic pump.

For example, Japan Laid-open Patent Application Publication No. JP-A-2004-144254 describes an exemplary HST system of a 1-pump 1-motor type. Further, Japan Laid-open Patent Application Publication No. JP-A-H11-230333 describes an exemplary HST system of a 1-pump 2-motors type.

The aforementioned HST-type construction vehicles travel at the maximum vehicle speed when a travelling load is minimized while an accelerator pedal is fully pressed down.

Further, the construction vehicles allowed to travel on the public roads are designed to travel within a vehicle speed limit (normally specified in the respective countries and regions, for instance, 38 km/h) even when reaching the maximum vehicle speed.

It should be noted that Japan Laid-open Patent Application Publication No. JP-A-2004-144254 describes a configuration that an operator is allowed to change the lower limit of the displacement of the travelling hydraulic motor for arbitrarily changing the maximum vehicle speed of the construction vehicle in accordance with an operator's intention. In this case, the construction vehicle is still designed to travel within the vehicle speed limit even when reaching the maximum vehicle speed.

SUMMARY

Meanwhile, the aforementioned construction vehicles often travel at the maximum vehicle speed during travelling on the flatland at a high speed while the accelerator pedal is fully pressed down by an operator for increasing productivity. In this case, the engine speed is maximized in response to the maximum acceleration opening degree.

A load during travelling on the flatland at the maximum vehicle speed is less than that during an excavation work using a working unit or that during travelling on an upward slope. Even when a load is small, there still remains a room for improvement of fuel efficiency in the well-known method that the engine speed is maximized as described above.

It is an object of the present invention to provide a construction vehicle including an HST for enhancing fuel consumption rate during high speed travelling and etc.

A construction vehicle according to a first aspect of the present invention includes an engine, a hydraulic pump for travelling, an accelerator pedal, a hydraulic motor for travelling, a travelling load detecting section, a vehicle speed detecting section and a control unit. The hydraulic pump for travelling is configured to be driven by the engine. The accelerator pedal is configured to adjust an acceleration opening degree in accordance with a pressed amount thereof. The hydraulic motor for travelling is configured to be driven by the pressurized oil discharged from the hydraulic pump for travelling. The travelling load detecting section is configured to detect a magnitude of the travelling load applied in travelling. The vehicle speed detecting section is configured to detect a vehicle speed. The control unit is configured to set an upper limit of a command value of the acceleration opening degree in accordance with the magnitude of the travelling load and a magnitude of the vehicle speed. Further, the control unit is configured to set a lower limit of a displacement of the hydraulic motor for travelling in order to maximize the vehicle speed at the acceleration opening degree limited to a predetermined amount.

According to the first aspect of the present invention, the construction vehicle (e.g., a wheel loader) including an HST is configured to execute the control for changing the upper limit of the command value of the acceleration opening degree in accordance with the travelling load.

Specifically, at around the maximum vehicle speed, the upper limit of the acceleration opening degree is set to be smaller in proportion to increase in the vehicle speed towards the maximum vehicle speed. Further, at around the maximum vehicle speed, the upper limit of the command value of the acceleration opening degree is set to be larger/smaller in proportion to increase/reduction in the travelling load detected by the travelling load detecting section. On the other hand, the lower limit of the motor displacement is set for maximizing the vehicle speed at the acceleration opening degree limited to the predetermined amount. Accordingly, the vehicle speed is reliably maximized even when the acceleration opening degree is limited.

Based on the above, the engine speed is limited at around the maximum vehicle speed even when the accelerator pedal is fully pressed down by an operator, for instance, during travelling on a flatland under a small travelling load. Therefore, the construction vehicle can travel at the maximum vehicle speed while the fuel consumption is inhibited.

A construction vehicle according to a second aspect of the present invention includes an engine, a hydraulic pump for travelling, an accelerator pedal, a hydraulic motor for travelling, a vehicle speed detecting section, a storage section and a control unit. The hydraulic pump for travelling is configured to be driven by the engine. The accelerator pedal is configured to adjust an acceleration opening degree in accordance with a pressed amount thereof. The hydraulic motor for travelling is configured to be driven by the pressurized oil discharged from the hydraulic pump for travelling. The vehicle speed detecting section is configured to detect a vehicle speed. The storage section is configured to store an engine torque curve data having a characteristic that an engine rotation is reduced in proportion to increase in the vehicle speed towards a maximum vehicle speed. The control unit is configured to control the engine based on the engine torque curve data in accordance with a magnitude of the vehicle speed. Further, the control unit is configured to set a lower limit of a displacement of the hydraulic motor for travelling in order to maximize the vehicle speed at the acceleration opening degree limited to a predetermined amount.

According to the second aspect of the present invention, the construction vehicle (e.g., a wheel loader) including an HST preliminarily stores the engine torque curve data having the characteristic that the engine speed is reduced in proportion to increase in the vehicle speed towards the maximum vehicle speed. Further, the construction vehicle is configured to change the engine torque curve data in accordance with the magnitude of the vehicle speed in order to control the engine.

Based on the above, the optimal engine torque curve data is selected even when the accelerator pedal is fully pressed down by an operator, for instance, during travelling on a flatland under a small travelling load. Therefore, the construction vehicle can travel at the maximum vehicle speed while the fuel consumption is inhibited.

A construction vehicle according to a third aspect of the present invention relates to the construction vehicle according to the second aspect of the present invention. The construction vehicle further includes a travelling load detecting section configured to detect a magnitude of a travelling load to be applied in travelling. Further, the storage section stores an engine torque curve data having a characteristic that an engine speed is reduced in proportion to reduction in the travelling load. The control unit is configured to control the engine based on the engine torque curve data in accordance with the magnitude of the travelling load. Further, the control unit is configured to set the lower limit of the displacement of the hydraulic motor for travelling in order to maximize the vehicle speed at the acceleration opening degree limited to the predetermined amount.

According to the third aspect of the present invention, the construction vehicle (e.g., a wheel loader) including an HST preliminarily stores the engine torque curve data having a characteristic that the engine speed is reduced in proportion to reduction in the travelling load and in proportion to increase in the vehicle speed towards the maximum vehicle speed. Further, the construction vehicle is configured to change the engine torque curve data in accordance with the magnitude of the travelling load that of the vehicle speed in order to control the engine.

Based on the above, the optimal engine torque curve data is selected even when the accelerator pedal is fully pressed down by an operator, for instance, during travelling on a flatland under a small travelling load. Therefore, the construction vehicle can travel at the maximum vehicle speed while the fuel consumption is inhibited. On the other hand, even under a large travelling load, for instance, during travelling on an upward slope, the acceleration performance until the vehicle speed reaches the maximum vehicle speed is enhanced by selecting the optimal engine torque curve data in accordance with the magnitude of the travelling load.

A construction vehicle according to a fourth aspect of the present invention relates to the construction vehicle according to the first aspect or the third aspect of the present invention. In the construction vehicle, the travelling load is a hydraulic pressure of the pressurized oil to be supplied to the hydraulic motor for travelling.

According to the fourth aspect of the present invention, the travelling pressure of the hydraulic motor for travelling is detected as a parameter in detecting the magnitude of the travelling load.

Therefore, it is possible to appropriately detect the magnitude of the travelling load and execute the aforementioned control of changing the setting of the upper limit of the acceleration opening degree.

A construction vehicle according to a fifth aspect of the present invention relates to the construction vehicle according to the first aspect or the third aspect of the present invention. In the construction vehicle, the travelling load is an output torque of the engine.

According to the fifth aspect of the present invention, the output torque of the engine is detected as a parameter in detecting the magnitude of the travelling load.

Therefore, it is possible to appropriately detect the magnitude of the travelling load and execute the aforementioned control of changing the setting of the upper limit of the acceleration opening degree.

A construction vehicle according to a sixth aspect of the present invention relates to the construction vehicle according to the first aspect or the third aspect of the present invention. In the construction vehicle, the travelling load is a product of a hydraulic pressure of the pressurized oil to be supplied to the hydraulic motor for travelling and the displacement of the hydraulic motor for travelling.

According to the sixth aspect of the present invention, the product of the hydraulic pressure of the pressurized oil to be supplied to the hydraulic motor for travelling and the displacement of the hydraulic motor for travelling is used as a parameter in detecting the magnitude of the travelling load.

The aforementioned product of the travelling pressure and the motor displacement herein indicates detection of the travelling load per se.

Therefore, it is possible to appropriately detect the magnitude of the travelling load and execute the aforementioned control of changing the setting of the upper limit of the acceleration opening degree.

According to the construction vehicle of the present invention, the fuel consumption rate can be enhanced, for instance, during travelling at a high speed.

DESCRIPTION OF EMBODIMENTS

First Exemplary Embodiment

A construction vehicle according to an exemplary embodiment of the present invention will be hereinafter explained with reference to FIGS. 1 to 9.

Structure of Wheel Loader 50

Figure 1:
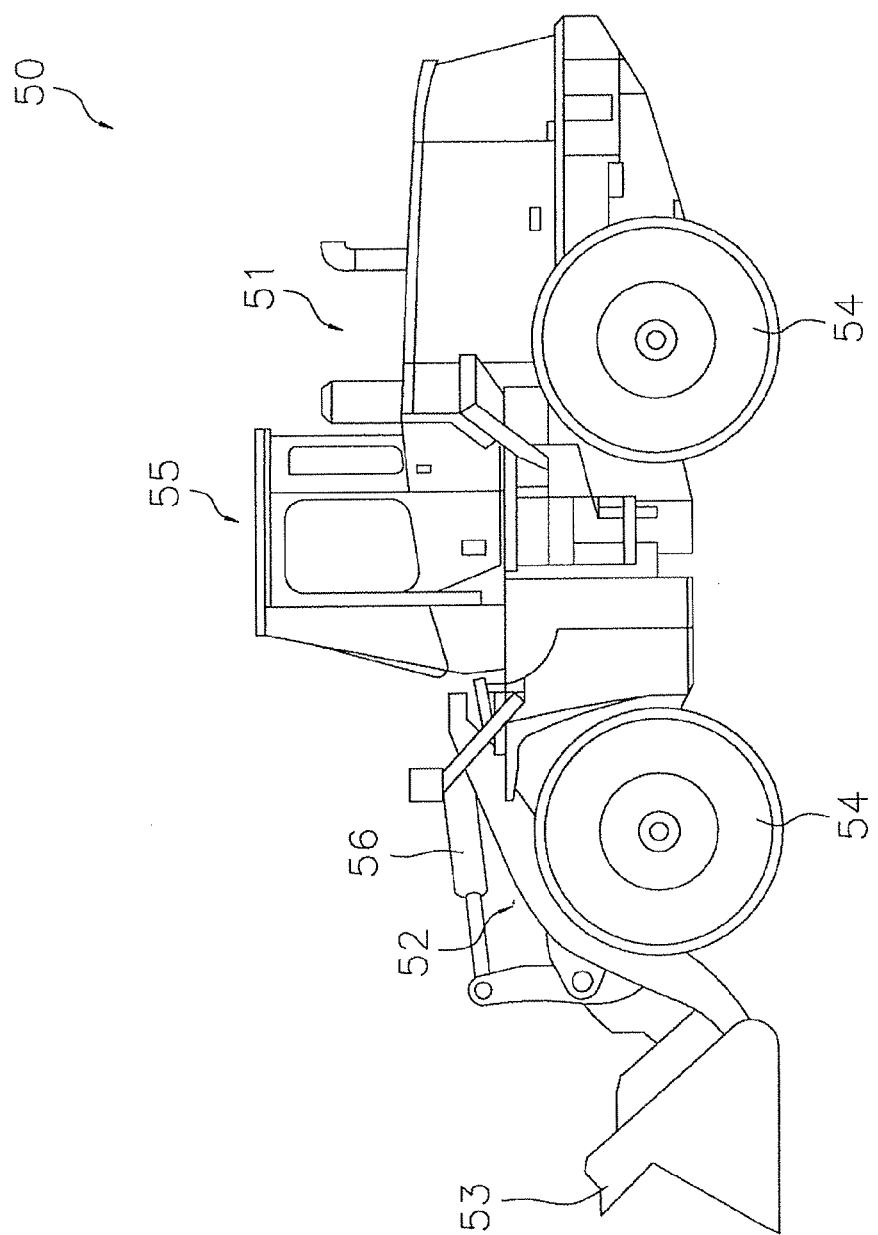
FIG. 1 is a structural side view of a wheel loader according to an exemplary embodiment of the present invention.

As illustrated in FIG. 1, a wheel loader (construction vehicle) 50 according to the present exemplary embodiment includes a vehicle body 51, lift arms (working unit) 52, a bucket (working unit) 53, four wheels (travelling wheels) 54 and a cab 55. The lift arms 52 are attached to the front part of the vehicle body 51. The bucket 53 is attached to the tips of the lift arms 52. The wheels 54 are rotated while supporting the vehicle body 51. The vehicle body 51 is thereby allowed to travel. The cab 55 is mounted on the top of the vehicle body 51.

The lift arms 52 are members for lifting up the bucket 53 attached to the tips thereof. The lift arms 52 are configured to be driven by lift cylinders 19 (see FIG. 2) disposed together therewith.

The bucket 53 is attached to the tips of the lift arms 52. The bucket 53 is configured to be tilted by means of bucket cylinders 56 for dumping materials therein.

Figure 2:
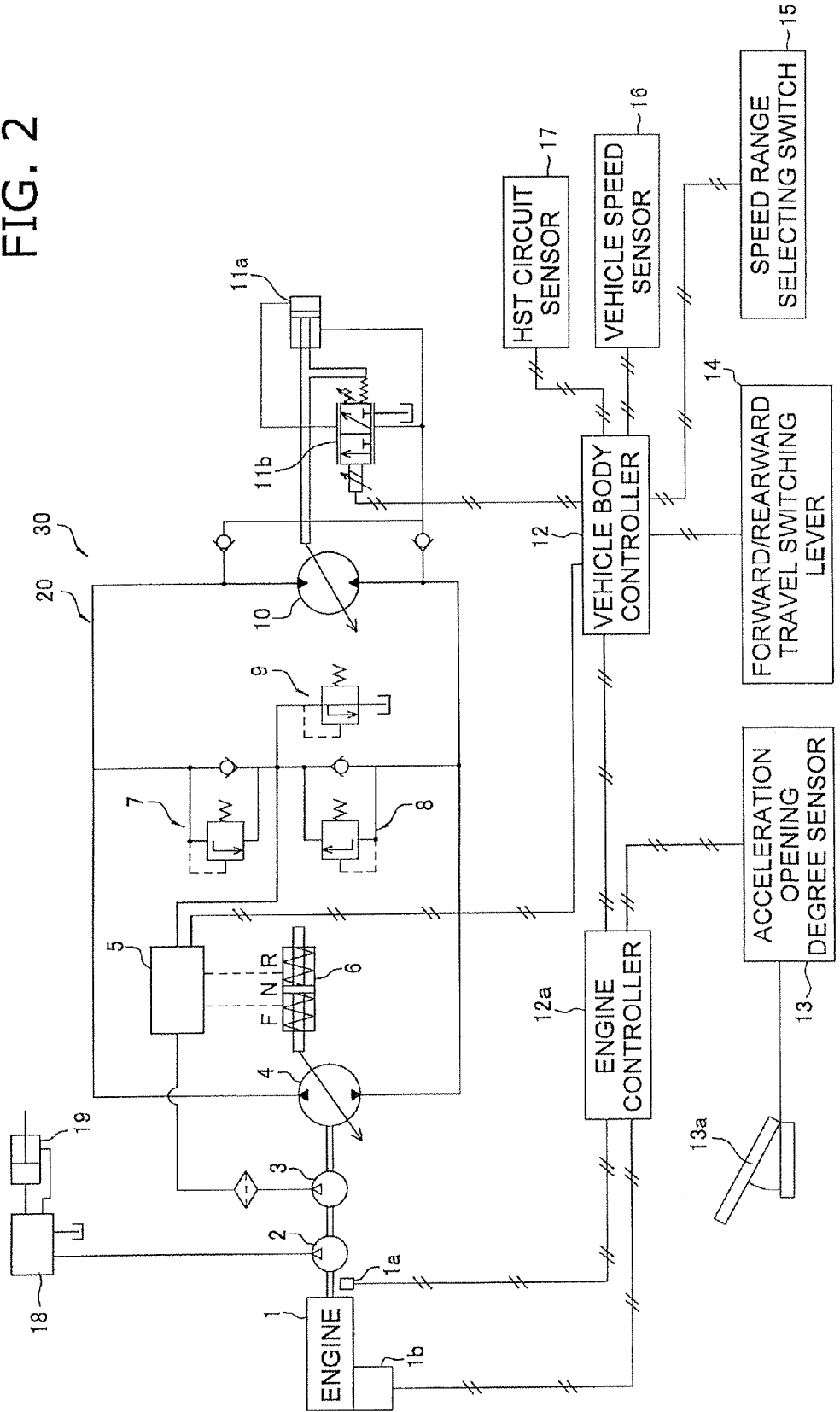
FIG. 2 is a hydraulic circuit diagram of an HST system of a 1-pump 1-motor type mounted in the wheel loader illustrated in FIG. 1.

As represented in FIG. 2, the lift cylinders 19 and the bucket cylinders 56 are driven by means of the pressurized oil to be discharged from a pump 2 for the working unit and steering (hereinafter referred to as "the working unit steering pump 2") configured to be driven by an engine 1. A control valve 18 is disposed in a hydraulic circuit for controlling the working unit (hereinafter referred to as "the working unit controlling hydraulic circuit") connecting the working unit steering pump 2 and components such as the lift cylinders 19 and the bucket cylinders 56. The control valve 18 is actuated in response to an operation of a working unit lever (not illustrated in the figures) and is thereby configured to control movements of components such as the lift cylinders 19 and the bucket cylinders 56. Further, the pressurized oil discharged from the working unit steering pump 2 is supplied to a steering circuit (not illustrated in the figures).

Overview of HST System

As represented in FIG. 2, the wheel loader 50 of the present exemplary embodiment is an HST-type construction vehicle. In the wheel loader 50, the pressurized oil, discharged from a hydraulic pump 4 for travelling (hereinafter referred to as "the travelling hydraulic pump 4") configured to be driven by the engine 1, is supplied to a hydraulic motor 10 for travelling (hereinafter referred to as "the travelling hydraulic motor 10") through a closed circuit (i.e., an HST circuit 20) and the travelling hydraulic motor 10 is driven by means of the pressurized oil supplied thereto. Accordingly, the wheel loader 50 is allowed to travel. The closed circuit, connecting the travelling hydraulic pump 4 and the travelling hydraulic motor 10, is hereinafter referred to as the HST circuit 20 and the pressure in the HST circuit 20 is referred to as an HST circuit pressure.

As represented in FIG. 2, the HST system of the present exemplary embodiment is so-called an HST system of a 1-pump 1-motor type that the single travelling hydraulic motor 10 is driven by means of the pressurized oil to be discharged from the single travelling hydraulic pump 4.

The travelling hydraulic pump 4 is a swash-plate type variable displacement axial piston pump. The travelling hydraulic motor 10 is a bent-axis type variable displacement axial piston motor.

A vehicle body controller 12 is configured to control the angle of the swash plate of the travelling hydraulic pump 4 and the angle of the bent axis of the travelling hydraulic motor 10. In other words, the vehicle body controller 12 is configured to control the displacement of the travelling hydraulic pump 4 (i.e., the amount of the pressurized oil to be discharged in a single pump rotation) and the displacement of the travelling hydraulic motor 10 (i.e., the amount of the pressurized oil to be required for a single motor rotation). It should be noted that the contents of the displacement controls of the travelling hydraulic pump 4 and the travelling hydraulic motor 10 by the vehicle body controller 12 will be described in detail in the following paragraphs.

Basic Control of Engine 1

The engine 1 is a diesel engine, and the output torque produced in the engine 1 is transmitted to components such as the working unit steering pump 2, a charge pump 3 and the travelling hydraulic pump 4. The engine 1 is provided with an engine controller 12a and a fuel injection device 1b. The engine 1 is further provided with an engine speed sensor 1a configured to detect the actual engine speed of the engine 1. An engine speed signal from the engine speed sensor 1a is inputted into the engine controller 12a. The engine controller 12a is configured to regulate the amount of fuel to be injected from the fuel injection device 1b for controlling the engine 1.

An accelerator pedal 13a is a component allowing an operator to control the engine speed of the engine 1. The accelerator pedal 13a is connected to an acceleration opening degree sensor 13. The acceleration opening degree sensor 13 is formed by components such as a potentiometer. The acceleration opening degree sensor 13 is configured to transmit an opening degree signal indicating the operating amount (i.e., the acceleration opening degree) of the accelerator pedal 13a to the engine controller 12a. The engine controller 12a is configured to receive the opening degree signal from the acceleration opening degree sensor 13 and output a command signal to the fuel injection device 1b for controlling the fuel injection amount of the fuel injection device 1b.

Figure 3:
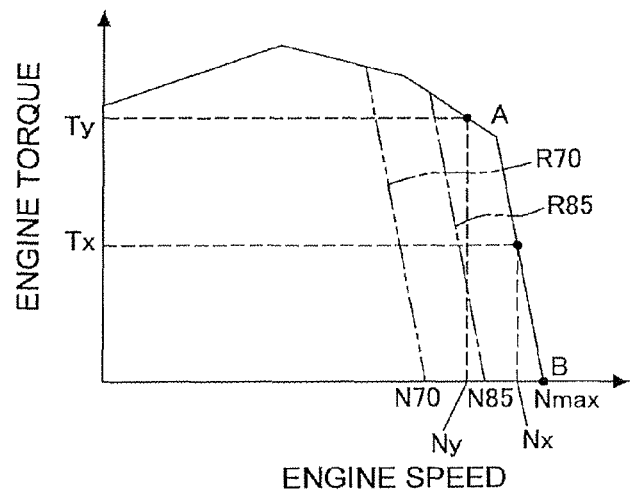
FIG. 3 is a chart representing a torque characteristic of an engine mounted in the wheel loader illustrated in FIG. 1.

FIG. 3 depicts a torque characteristic of the engine 1 of the present exemplary embodiment with a solid line. In the engine 1, a target engine speed is set to be Nmax when the acceleration opening degree is maximized (i.e., 100%). When the acceleration opening degree is 85% of the maximized opening degree, for instance, the engine controller 12a is configured to set a regulation line depicted with a dotted line R85 where the target engine speed is N85 (=0.85·Nmax). When the acceleration opening degree is 70% of the maximized opening degree, on the other hand, the engine controller 12a is configured to set a regulation line depicted with a dashed two-dotted line R70 where the target engine speed is N70 (=0.7·Nmax).

The engine controller 12a is thus configured to set the target engine speed in accordance with the acceleration opening degree. However, the actual engine speed of the engine 1 varies in accordance with the magnitude of a load. As represented in FIG. 3, for instance, the actual engine speed of the engine 1 is Nmax when the acceleration opening degree is 100% and no load is applied to the engine 1. However, the engine speed is reduced to Nx when the engine torque (i.e., a load applied to the engine 1) is Tx. On the other hand, the engine speed is reduced to Ny when the engine torque is Ty.

Detailed Explanation of HST System

As represented in FIG. 2, a hydraulic drive mechanism 30 forming the HST system of the present exemplary embodiment mainly includes the charge pump 3, the travelling hydraulic pump 4, the travelling hydraulic motor 10 and a vehicle body controller (control unit) 12.

Charge Pump 3

The charge pump 3 is a fixed displacement pump to be driven by the engine 1 for supplying the pressurized oil to the HST circuit 20. Further, the charge pump 3 also functions as a hydraulic source configured to produce a pilot pressure allowing a pump control valve 5 to control a pump displacement control cylinder 6. It should be noted that the pump control valve 5 and the pump displacement control cylinder 6 will be described in detail in the following paragraphs.

Travelling Hydraulic Pump 4

The travelling hydraulic pump 4 is a swash plate type variable displacement axial piston pump. The pressurized oil discharged from the travelling hydraulic pump 4 is supplied to the HST circuit 20. High pressure relief valves 7 and 8 are disposed for protecting the hydraulic machines such as the pumps and the motors. The pressure of the HST circuit 20 (i.e., an HST circuit pressure) is kept to be less than or equal to a predetermined pressure by the high pressure relief valves 7 and 8. Further, the lowest pressure of the HST circuit 20 is corrected by a low pressure relief valve 9 and the charge pump 3. It should be noted that these are heretofore known components and explanation thereof will be hereinafter omitted.

The pump control valve 5 and the pump displacement control cylinder 6 are connected to the travelling hydraulic pump 4. The pump control valve 5 and the pump displacement control cylinder 6 are configured to control the angle of the swash plate of the travelling hydraulic pump 4 for controlling the displacement of the travelling hydraulic pump 4.

Specifically, the pump control valve 5 is configured to produce a pilot pressure based on a control signal from the vehicle body controller 12, and the pump displacement control cylinder 6 is controlled by means of the pilot pressure. Accordingly, the angle of the swash plate of the travelling hydraulic pump 4 is controlled.

Figure 4:
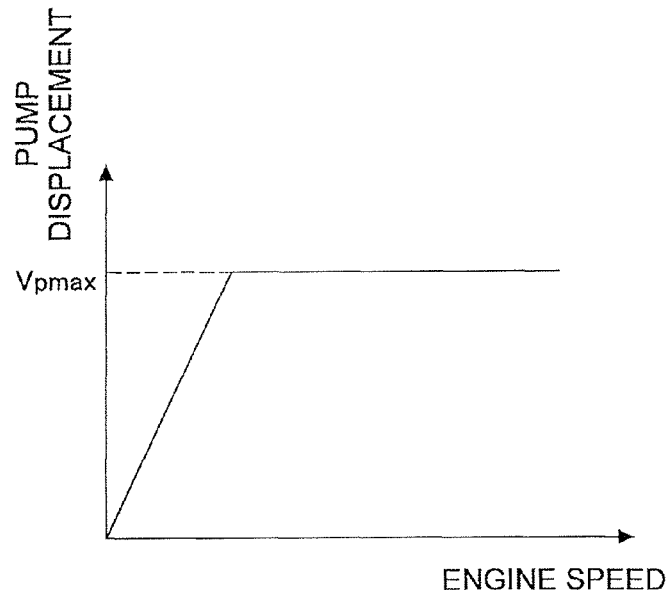
FIG. 4 is a chart representing the relation between the engine speed and the displacement of a travelling hydraulic pump in the wheel loader illustrated in FIG. 1.

The vehicle body controller 12 is configured to output a control signal to the pump control valve 5 for increasing the displacement of the travelling hydraulic pump 4 (i.e., the amount of the pressurized oil to be discharged in a single pump rotation) in proportion to increase in the engine speed. Therefore, the displacement of the travelling hydraulic pump 4 is increased in proportion to increase in the engine speed where the HST circuit pressure is constant, as represented in FIG. 4. It should be noted that Vpmax in FIG. 4 is the maximum displacement obtainable by the travelling hydraulic pump 4.

Based on the above, the flow amount of the pressurized oil to be discharged from the travelling hydraulic pump 4 (i.e., the amount of the pressurized oil flowing through the HST circuit 20 per unit time) is increased in proportion to increase in the engine speed after the displacement of the travelling hydraulic pump 4 is increased in proportion to the engine speed and reaches the maximum displacement (Vpmax).

It should be noted that the swash plate of the travelling hydraulic pump 4 can be tilted in either the forward direction or the reverse direction. In other words, the direction of the pressurized oil flowing through the HST circuit 20 can be reversed by reversing the tilt direction of the swash plate of the travelling hydraulic pump 4. The tilt direction of the swash plate is also controlled based on a control signal from the vehicle body controller 12.

Travelling Hydraulic Motor 10

The travelling hydraulic motor 10 is a bent-axis type variable displacement axial piston motor. The travelling hydraulic motor 10 is configured to be driven by means of the pressurized oil discharged from the travelling hydraulic pump 4 and produce a driving force for travelling. The travelling hydraulic motor 10 is provided with a motor cylinder 11a and an electronic servo valve 11b for motor control (hereinafter referred to as the motor control electronic servo valve 11b). The motor cylinder 11a is configured to control the angle of the bent axis of the travelling hydraulic motor 10. The motor control electronic servo valve 11b is configured to control the motor cylinder 11a. The motor control electronic servo valve 11b is an electromagnetic control valve configured to be controlled based on a control signal from the vehicle body controller 12. The motor control electronic servo valve 11b is configured to control the motor cylinder 11a for arbitrarily changing the displacement of the travelling hydraulic motor 10 (i.e., the amount of the pressurized oil required for a single motor rotation). The displacement control of the travelling hydraulic motor 10 to be executed by the vehicle body controller 12 will be described in detail in the following paragraphs.

Vehicle Body Controller 12

The vehicle body controller 12 corresponds to a control unit of the present invention and receives signals inputted thereto respectively from a forward/rearward travel switching lever 14, a speed range selecting switch 15, a vehicle speed sensor (vehicle speed detection section) 16 and an HST circuit sensor 17.

The signal inputted into the vehicle body controller 12 from the forward/rearward travel switching lever 14 indicates the position of the forward/rearward travel switching lever 14, i.e., any one of a forward travel position, a neutral position and a rearward travel position. The vehicle body controller 12 is configured to control the pilot pressure to be released from the pump control valve 5 to the pump displacement control cylinder 6 based on the signal from the forward/rearward travel switching lever 14 for switching the tilt direction of the swash plate of the travelling hydraulic pump 4. Accordingly, the vehicle body controller 12 is configured to reverse the direction of the pressurized oil flowing within the HST circuit 20 when the position of the forward/rearward travel switching lever 14 is changed between the forward travel position and the rearward travel position.

The speed range selecting switch 15 is a switch allowing an operator to select any one of the speed ranges. The wheel loader 50 of the present exemplary embodiment has first to fourth speed ranges. In an excavation work or the like using the working unit, the operator is allowed to select any one of the first to third speed ranges for working. When high speed travelling is required, the operator is allowed to select the fourth speed range for travelling. The vehicle body controller 12 receives input of a signal indicating the speed range selected by the speed range selecting switch 15.

The vehicle speed sensor (vehicle speed detecting section) 16 is configured to detect the vehicle speed based on the rotation speed of wheel driving shafts. The vehicle speed sensor 16 is configured to transmit a vehicle speed signal to the vehicle body controller 12.

The HST circuit sensor 17 is configured to detect the pressure of the HST circuit 20 (i.e., the HST circuit pressure) and transmit a signal indicating the HST circuit pressure to the vehicle body controller 12. It should be noted that the HST circuit pressure is increased/reduced in proportion to increase/reduction in a travelling load where the displacement of the travelling hydraulic motor 10 is constant.

Figure 5:
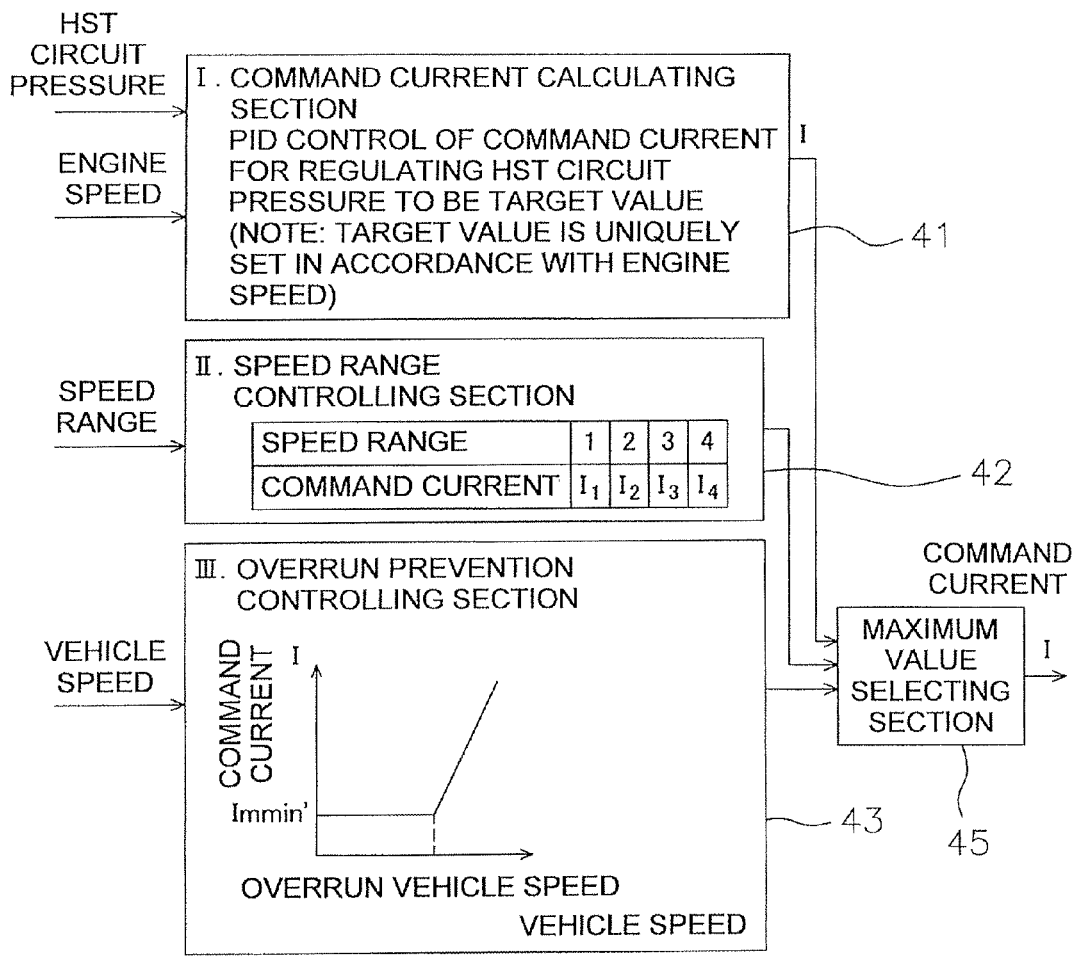
FIG. 5 is a control diagram representing the specific content of a processing to be executed in a vehicle body controller mounted in the wheel loader illustrated in FIG. 1 for setting the displacement of a travelling hydraulic motor.

As represented in FIG. 5, the vehicle body controller 12 includes a command current calculating section 41, a speed range controlling section 42, an overrun prevention controlling section 43 and a maximum value selecting section 45 as functional blocks. The command current calculating section 41, the speed range controlling section 42 and the overrun prevention controlling section 43 are respectively configured to calculate command currents based on signals transmitted from the respective sensors and transmit the command currents to the maximum value selecting section 45. The maximum value selecting section 45 is configured to select the highest one of the command currents and transmit the selected command current to the motor control electronic servo valve 11b. It should be noted that the method of calculating the command currents in the command current calculating section 41, the speed range controlling section 42 and the overrun prevention controlling section 43 will be described in detail in the following paragraphs.

Figure 6:
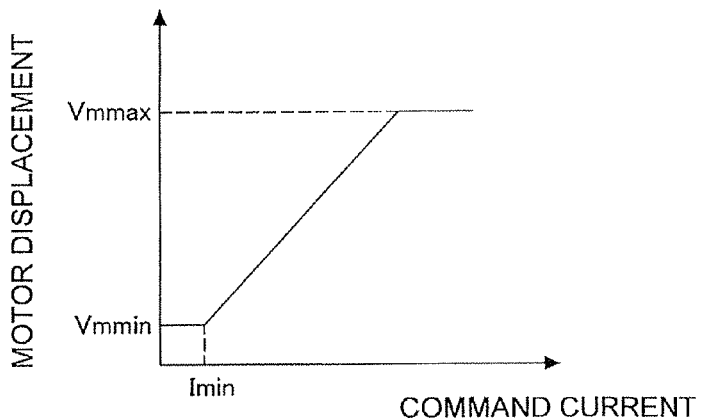
FIG. 6 is a chart representing the relation between the displacement of the travelling hydraulic motor and a command current to be outputted from the vehicle body controller mounted in the wheel loader illustrated in FIG. 1.

In the present exemplary embodiment, the displacement of the travelling hydraulic motor 10 is herein increased/reduced in proportion to increase/reduction in a command current to be transmitted to the motor control electronic servo valve 11b, as represented in FIG. 6. It should be noted that Vmmax in FIG. 6 is the mechanically determined maximum displacement of the travelling hydraulic motor 10 (i.e., the upper limit of the mechanical displacement) while Vmmin in FIG. 6 is the mechanically determined minimum displacement of the travelling hydraulic motor 10 (i.e., the lower limit of the mechanical displacement).

With the aforementioned configuration, the vehicle body controller 12 is configured to control the displacement of the travelling hydraulic motor 10 to be the largest one of the displacements calculated by the command current calculating section 41, the speed range controlling section 42 and the overrun prevention controlling section 43 in a range from Vmmin to Vmmax.

Determination of Motor Displacement by Command Current Calculating Section 41

The command current calculating section 41 is disposed for controlling the displacement of the travelling hydraulic motor 10 in accordance with a load.

The command current calculating section 41 is configured to receive the HST circuit pressure from the HST circuit sensor 17 and the engine speed from the engine speed sensor 1a and executes a PID control of a command current for regulating the HST circuit pressure to be a target value. It should be noted that the target value of the HST circuit pressure is uniquely set for the respective engine speeds.

By the action of the command current calculating section 41, the displacement of the travelling hydraulic motor 10 is configured to be reduced/increased in proportion to reduction/increase in the HST circuit pressure for increasing/reducing the HST circuit pressure. In other words, the displacement of the travelling hydraulic motor 10 is reduced when the travelling load is reduced by the action of the command current calculating section 41. Accordingly, the vehicle speed is increased while the driving torque of the wheels 54 is reduced. By contrast, the displacement of the travelling hydraulic motor 10 is increased when the travelling load is increased. Accordingly, the vehicle speed is reduced while the driving torque of the wheels 54 is increased.

It should be noted that the displacement of the travelling hydraulic motor 10 is changed by the command current outputted from the command current calculating section 41 in a range from the lower limit of the mechanical displacement (i.e., Vmmin in FIG. 6) to the upper limit of the mechanical displacement (Vmmax in FIG. 6).

Determination of Minimum Motor Displacement by Speed Range Controlling Section 42

The speed range controlling section 42 is configured to set the upper limits of the vehicle speed that can be reached in the respective speed ranges.

The speed range controlling section 42 is configured to select and output one of minimum command currents $I_4$ to $I_4$ preliminarily stored in accordance with a detection result in the speed range selecting switch 15, i.e., the currently selected one of the first, second, third and fourth speed ranges. The relation "$I_1 > I_2 > I_3 > I_4$" is established among the magnitudes of the command current $I_1$ corresponding to the selection of the first speed range, the command current $I_2$ corresponding to the selection of the second speed range, the command current $I_3$ corresponding to the selection of the third speed range and the command current $I_4$ corresponding to the selection of the fourth speed range.

When the accelerator pedal is fully pressed down while the travelling load (i.e., the HST circuit pressure) is sufficiently small, the vehicle speed is limited by the action of the speed range controlling section 42 and the maximum value selecting section 45 under the following conditions: the vehicle speed achievable in selecting the third speed range is lower than that achievable in selecting the fourth speed range; the vehicle speed achievable in selecting the second speed range is lower than that achievable in selecting the third speed range; and the vehicle speed achievable in selecting the first speed range is lower than that achievable in selecting the second speed range.

The command current $I_4$, configured to be outputted from the speed range controlling section 42 in the fourth speed range, may be herein set to be lower than or equal to, or alternatively, slightly higher than a current (Imin in FIG. 6) where the displacement of the travelling hydraulic motor 10 is the lower limit of the mechanical displacement (Vmmin in FIG. 6). When the command current is herein set to be lower than or equal to Imin, the minimum displacement obtainable by the travelling hydraulic motor 10 is the lower limit Vmmin of the mechanical displacement. When the command current is slightly higher than Imin, on the other hand, the minimum displacement obtainable by the travelling hydraulic motor 10 is a displacement corresponding to the command current $I_4$. In other words, the displacement corresponding to the command current $I_4$ is substantially the lower limit of the displacement. The displacement of the travelling hydraulic motor 10 is never reduced to the lower limit Vmmin of the mechanical displacement.

Determination of Motor Displacement by Overrun Prevention Controlling Section 43

The overrun prevention controlling section 43 is disposed for preventing occurrence of overrun on a steep downward slope or the like.

The overrun prevention controlling section 43 is configured to output a command current in accordance with the vehicle speed based on a chart (see III in FIG. 5) that a command current is increased when the vehicle speed detected by the vehicle speed sensor 16 is greater than or equal to a predetermined overrun vehicle speed. In other words, the overrun prevention controlling section 43 is configured to increase the displacement of the travelling hydraulic motor 10 when the vehicle speed is greater than or equal to the predetermined overrun vehicle speed in order to prevent the vehicle speed from being further increased.

The minimum command current (Imin' in FIG. 6) to be outputted from the overrun prevention controlling section 43 is herein set to be at least lower than the command current I4 to be outputted from the speed range controlling section 42 in the fourth speed range. Therefore, the command current to be outputted from the overrun prevention controlling section 43 is never selected by the maximum value selecting section 45 when the vehicle speed is lower than or equal to the overrun vehicle speed. In other words, the overrun prevention controlling section 43 is configured not to substantially control the displacement of the travelling hydraulic motor 10 when the vehicle speed is lower than or equal to the overrun vehicle speed.

Setting of Upper Limit of Acceleration Opening Degree

The vehicle body controller 12 further includes an acceleration opening degree upper limit setting section 47.

Figure 7:
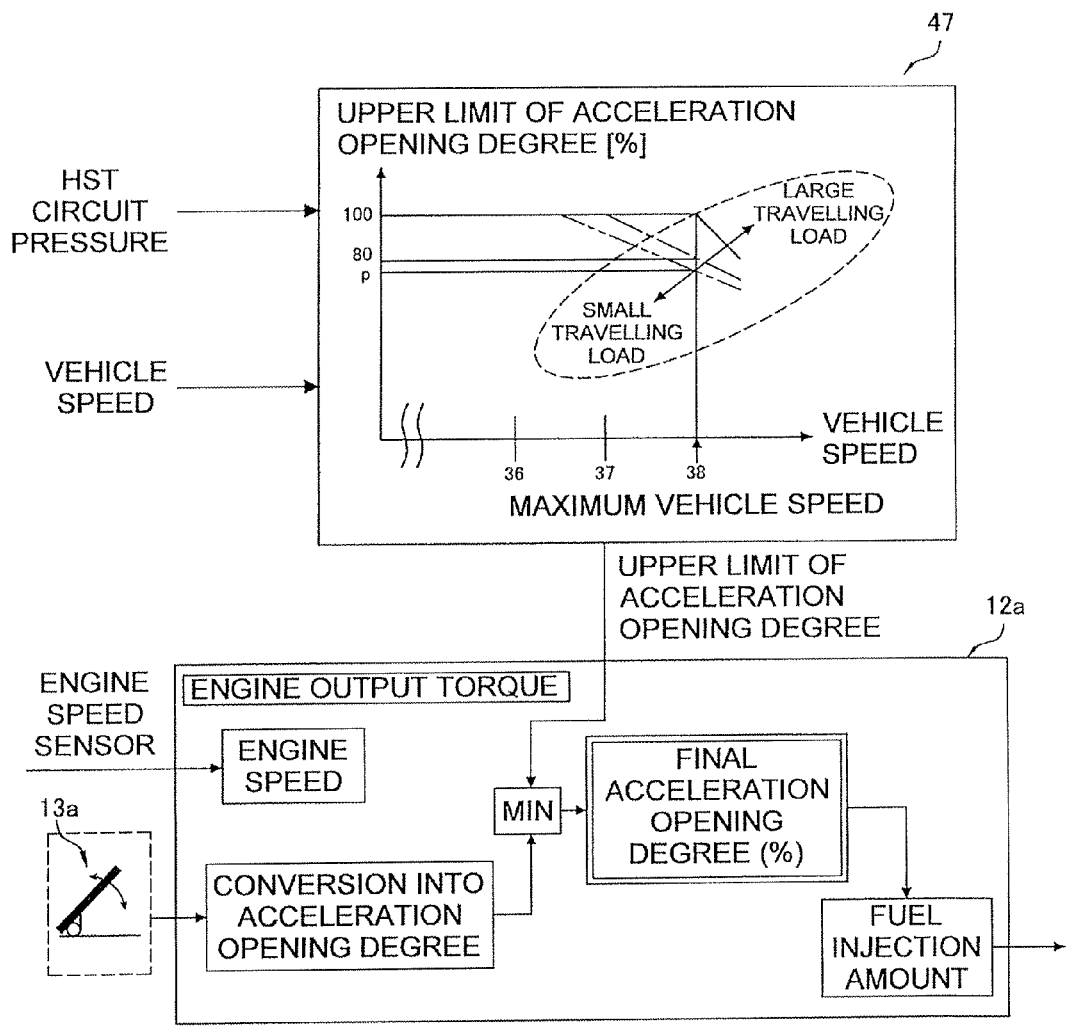
FIG. 7 is a control diagram representing the specific content of a processing to be executed in a control unit mounted in the wheel loader illustrated in FIG. 1.

As represented in FIG. 7, the acceleration opening degree upper limit setting section 47 is configured to calculate the upper limit of the acceleration opening degree based on a signal to be inputted from the HST circuit sensor 17 (i.e., a signal indicating the HST circuit pressure) and a signal to be inputted from the vehicle speed sensor 16 (i.e., a signal indicting the vehicle speed) and output the calculated upper limit of the acceleration opening degree to the engine controller 12a.

As represented in FIG. 7, the engine controller 12a is configured to select a smaller one of an opening degree signal to be outputted from the acceleration opening degree sensor 13 and an acceleration opening degree upper limit signal to be outputted from the vehicle body controller 12 and determines the fuel injection amount using the selected signal as the final acceleration opening degree. In other words, the engine controller 12a is configured to regulate the engine speed of the engine 1 in accordance with the pressed amount of the accelerator pedal 13a (i.e., the acceleration opening degree) within the upper limit of the acceleration opening degree set by the acceleration opening degree upper limit setting section 47.

In the present exemplary embodiment, the engine controller 12a also forms a part of the control unit of the present invention.

As represented in FIG. 7, the acceleration opening degree upper limit setting section 47 is herein configured to limit the acceleration opening degree when the wheel loader 50 travels at around the maximum vehicle speed (i.e., 38 km/h). The magnitude of the limit on the acceleration opening degree is set to be increased in proportion to increase in the vehicle speed towards the maximum vehicle speed (i.e., 38 km/h) while being set to be reduced in proportion to reduction in the vehicle speed. Further, the limited amount of the acceleration opening degree is changed in accordance with a travelling load (i.e., the HST circuit pressure). Specifically, the upper limit of the acceleration opening degree under a small travelling load is set to be smaller than that under a large travelling load.

In FIG. 7, a dashed dotted line depicts the limited amount during travelling on a flatland. When the vehicle speed reaches the maximum vehicle speed of 38 km/h under the condition, the acceleration opening degree is limited to 80% of the maximum opening degree. In other words, the engine speed is limited to 80% of the maximum engine speed when the vehicle speed reaches the maximum vehicle speed of 38 km/h while the accelerator pedal 13a is fully pressed down.

It should be noted that the engine speed is further limited to a smaller value (p %, p<80), as depicted with a dashed two-dotted line in FIG. 7, when the wheel loader 50 starts traveling on a downward slope or the like during travelling on a flatland and the travelling load is further reduced than that applied during travelling on a flatland.

Designing of Lower Limit of Motor Displacement Based on Vehicle Speed Limit

By the way, the construction vehicles (e.g., the wheel loaders) allowed to travel on the public roads are required to be designed to travel within a vehicle speed limit (normally specified in the respective countries and regions, for instance, 38 km/h) even when reaching the maximum vehicle speed.

The travelling hydraulic motor 10 is herein rotated at the highest speed and the vehicle speed of the wheel loader 50 is maximized when the flow amount of the pressurized oil flowing into the travelling hydraulic motor 10 is maximized and the displacement of the travelling hydraulic motor 10 is minimized. It is possible to design and obtain the engine speed when the accelerator pedal is fully pressed down and the flow amount of the pressurized oil herein supplied from the travelling hydraulic pump 4 to the HST circuit 20 under the load applied during travelling on a flatland. Therefore, it is possible to calculate the lower limit of the displacement desirably set for the travelling hydraulic motor 10 when the maximum vehicle speed is determined. Simply put, it is possible to arbitrarily design and determine the lower limit of the displacement allowable for the travelling hydraulic motor 10 in accordance with the vehicle speed limit.

It should be noted in the present exemplary embodiment that the maximum vehicle speed of the wheel loader 50 is set to be 38 km/h as described above. Further, the lower limit of the displacement desirably set for the travelling hydraulic motor 10 (i.e., either the lower limit Vmmin of the mechanical displacement or the displacement corresponding to the command current $I_4$) is set based on the flow amount when the engine speed is 80% of the maximum engine speed.

Traction Force Characteristic of HST System

The traction force characteristic of the HST system depends on specifications of the respective devices such as the engine 1, the travelling hydraulic pump 4 and the travelling hydraulic motor 10.

Figure 8:
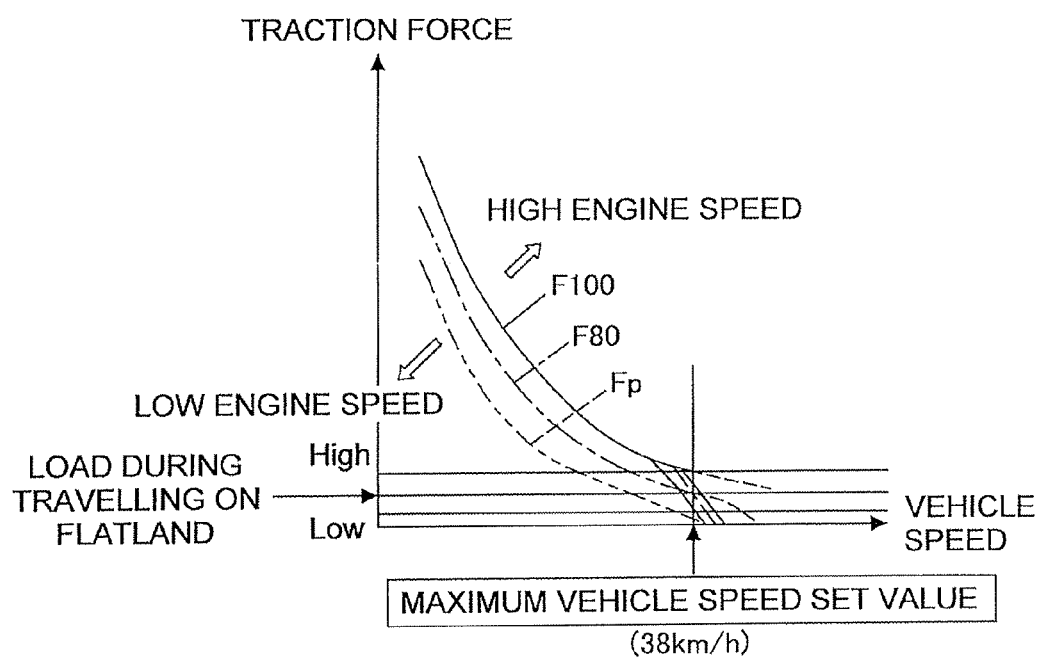
FIG. 8 is a chart representing a traction force characteristic of the HST system mounted in the wheel loader illustrated in FIG. 1.
Figure 9:
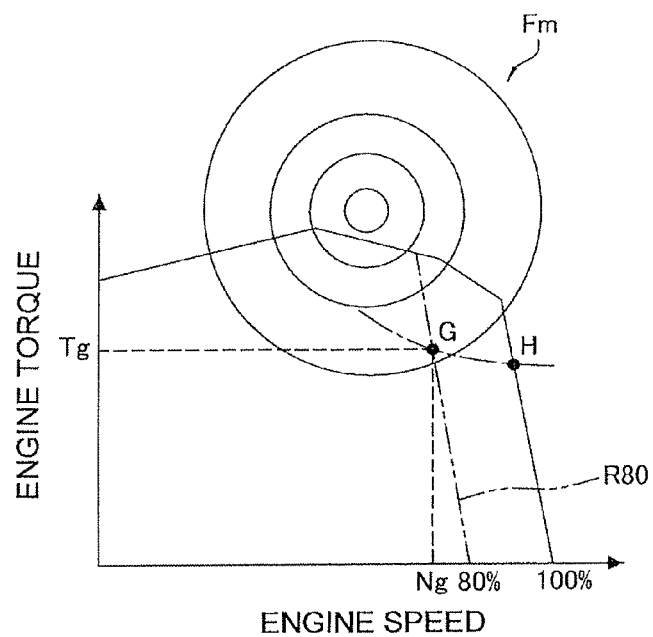
FIG. 9 includes characteristic line charts (a) and (b) respectively representing the relation between the torque characteristic and the fuel consumption rate in the engine mounted in the wheel loader illustrated in FIG. 1.
Figure 9:
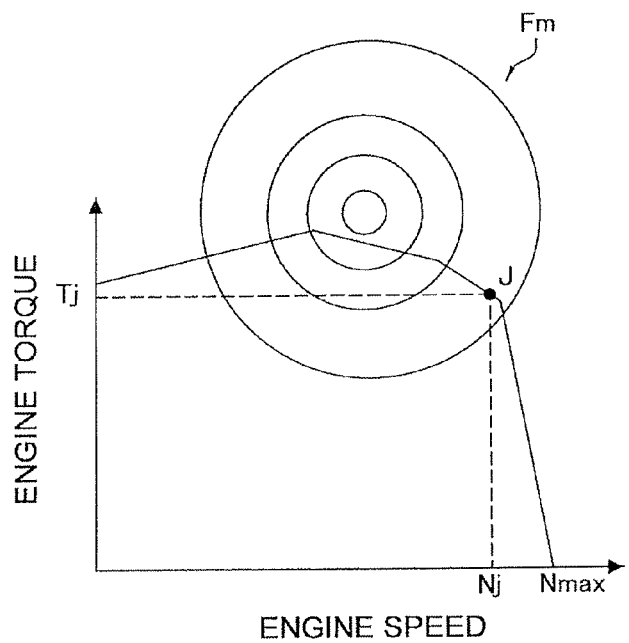

FIG. 8 represents the traction force characteristic of the HST system of the present exemplary embodiment.

In FIG. 8, a solid line F100 is a curve indicating the maximum traction force that can be outputted by the present HST system when the engine speed is maximized (i.e., 100%). Further, a dashed dotted line F80 indicates the traction force that can be outputted by the present HST system when the engine speed is 80% of the maximum engine speed. Yet further, a dashed two-dotted line Fp indicates the traction force that can be outputted by the present HST system when the engine speed is p % of the maximum engine speed (p<80). It should be noted that the product of the traction force and the vehicle speed is horsepower (power). As is obvious from FIG. 8, the horsepower is reduced in proportion to reduction in the engine speed. Further, all the curves F100, F80 and Fp are equal horsepower curves (equal power curves).

In the present exemplary embodiment, the vehicle speed is 38 km/h where the equal horsepower curve F80 (when the engine speed is 80% of the maximum engine speed) intersects with a line indicating the traction force corresponding to a load applied during travelling on a flatland, as represented in FIG. 8. Because of this, the acceleration opening degree upper limit setting section 47 is configured to limit the acceleration opening degree to be 80% of the maximum opening degree when the vehicle speed is 38 km/h in the present exemplary embodiment.

Specific Control Examples

Controls to be executed by the HST system of the embodiment will be hereinafter explained with specific examples.

Travelling on Flatland at Maximum Vehicle Speed

The following relates to explanation of the control to be executed when the accelerator pedal 13a is fully pressed down in the fourth speed range selected by an operator and the wheel loader stably travels constantly at around the maximum vehicle speed of 38 km/h on a flatland.

The travelling load is herein sufficiently small because the wheel loader travels stably on a flatland. The HST circuit pressure is thereby sufficiently small as well. Therefore, the vehicle body controller 12 reduces the displacement of the travelling hydraulic motor 10 to the minimum displacement (i.e., the lower limit of the displacement).

Further, the engine speed of the engine 1 is limited to 80% of the maximum engine speed (see FIG. 7) by the action of the control unit (i.e., the vehicle body controller 12 and the engine controller 12a) because the HST circuit pressure is sufficiently small and the vehicle speed reaches 38 km/h. In other words, the control unit sets a regulation line R80 depicted in FIG. 9(a). In this case, the engine 1 is rotated at an engine speed Ng while producing a torque Tg where a point G is set as a matched point between the torque required for the HST system and the torque curve of the engine 1.

In the present exemplary embodiment, the lower limit of the displacement of the travelling hydraulic motor 10 is herein set for regulating the maximum vehicle speed to be the vehicle speed limit (38 km/h) when the engine 1 is rotated at the engine speed Ng in the point G. Therefore, the wheel loader 50 travels constantly at the speed limit of 38 km/h under the condition.

With reference to FIG. 9(a), a difference will be explained between the fuel consumption rate in the well-known control and that in the control of the HST system of the present exemplary embodiment. It should be noted in FIG. 9(a) that Fm indicates fuel efficiency and the center part thereof indicates less fuel consumption rate than the outer part thereof.

A point H is an intersection between a torque curve of an acceleration opening degree of 100% and an equal horsepower curve (equal power curve) depicted with a dashed dotted line passing through the point G. The point H is herein set as the matching point at the maximum vehicle speed (38 km/h) in the well-known control. In the well-known control, the lower limit of the displacement of the travelling hydraulic motor is set for regulating the maximum vehicle speed to be the vehicle speed limit (38 km/h) when the engine is rotated at the engine speed in the point H.

As is obvious from FIG. 9(a), the point G indicates less fuel consumption rate than the point H in terms of their positions. Therefore, the control of the HST system of the present exemplary embodiment can achieve a more reduced fuel consumption rate than the well-known control.

Starting Travelling on Upward Slope at Maximum Vehicle Speed

The following relates to explanation of the control to be executed when the accelerator pedal 13a is fully pressed down in the fourth speed range selected by an operator and the wheel loader starts travelling on an upward slope during travelling at around the maximum vehicle speed (38 km/h) and the travelling load is thereby increased.

In this case, the HST circuit pressure is increased. Therefore, the displacement of the travelling hydraulic motor 10 is increased and the vehicle speed is reduced by the action of the command current calculating section 41 of the vehicle body controller 12.

Further, due to reduction in the HST circuit pressure and the vehicle speed, the final acceleration opening degree becomes 100% without limitation on the upper limit thereof by the control unit.

As represented in FIG. 9(b), the engine 1 is herein rotated at an engine speed Nj while producing a torque Tj where a point J is set as a matching point between the torque curve of the engine 1 and a torque herein required for the HST system.

Likewise, the engine torque curve and the required torque are matched in the point J under the same condition in the well-known control. Therefore, there is hardly difference between the fuel consumption rate in the well-known control and that in the control of the HST system of the present exemplary embodiment under the condition.

Acceleration up to Maximum Vehicle Speed on Flatland

The following relates to explanation of the control to be executed when the accelerator pedal 13a is fully pressed down for accelerating the wheel loader 50 up to the maximum vehicle speed (i.e., 38 km/h) during travelling at a relatively high speed in the fourth speed range on a flatland.

In this case, the travelling load is firstly increased for accelerating the wheel loader 50. For example, the matching point is assumed to be positioned in the point J of FIG. 9(b) in the initial phase of the acceleration.

As described above, the matching point is assumed to be finally positioned in the point G of FIG. 9(a) after the vehicle speed reaches the maximum vehicle speed. Therefore, the matching point is gradually shifted from the point J of FIG. 9(b) towards the point G of FIG. 9(a).

In the well-known control, by contrast, the matching point is gradually shifted from the point J of FIG. 9(b) towards the point H of FIG. 9(a).

In the present exemplary embodiment, the upper limit of the acceleration opening degree is not reduced so much under a high travelling load even when the vehicle speed gets closer to the vehicle speed limit (i.e., 38 km/h). Thus, the upper limit of the command value of the acceleration opening degree is changed in accordance with the travelling load. Therefore, acceleration performance can be enhanced under a high load until the vehicle speed reaches the maximum vehicle speed.

Second Exemplary Embodiment

A construction vehicle according to another exemplary embodiment of the present invention will be hereinafter explained with reference to FIG. 10.

In the aforementioned first exemplary embodiment, the engine controller 12a is configured to calculate an engine output torque currently being produced by the engine 1. Therefore, the engine output torque calculated by the engine controller 12a can be used as the travelling load instead of the HST circuit pressure adopted in the aforementioned first exemplary embodiment.

Figure 10:
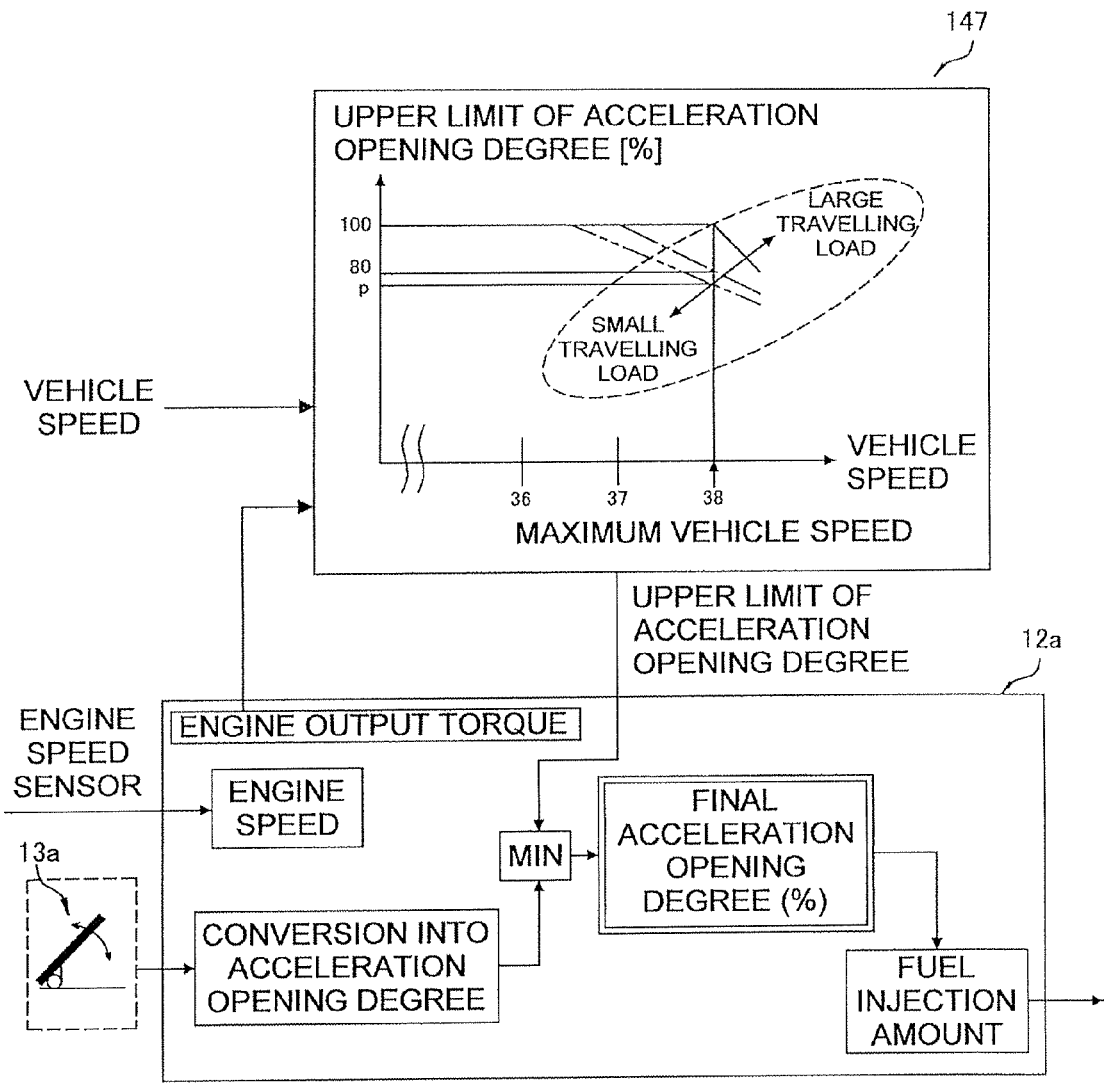
FIG. 10 is a control diagram representing the specific content of a processing to be executed in a control unit according to a second exemplary embodiment of the present invention.

As represented in FIG. 10, the following control is specifically executed. The engine controller 12a is herein configured to input a signal indicating the engine output torque into an acceleration opening degree upper limit setting section 147. The acceleration opening degree setting section 147 is then configured to reduce/increase the upper limit of the acceleration opening degree in proportion to increase/reduction in the engine output torque (i.e., the travelling load).

It should be noted that the other components and configurations are the same as those in the aforementioned first exemplary embodiment and explanation thereof will be thereby hereinafter omitted.

Based on the above, the present exemplary embodiment can achieve the same advantageous effects as those achieved in the aforementioned first exemplary embodiment.

Third Exemplary Embodiment

Alternatively, the product of the HST circuit pressure and the displacement of the travelling hydraulic motor 10 may be used as the travelling load instead of only the HST circuit pressure in the aforementioned first exemplary embodiment.

In this case, the following control may be executed. Not only a signal indicating the HST circuit pressure and a signal indicating the vehicle speed, but also a command current (i.e., a signal indicating the motor displacement) to be outputted from the maximum value selecting section 45 (see FIG. 5) may be configured to be inputted into the acceleration opening degree upper limit setting section 47 represented in FIG. 7. Then, the acceleration opening degree upper limit setting section 47 may be configured to increase/reduce the limited amount of the upper limit of the acceleration opening degree in proportion to increase/reduction in the product (i.e., the travelling load) of the HST circuit pressure and the motor displacement.

Based on the above, the present exemplary embodiment can achieve the same advantageous effects achieved in the aforementioned first and second exemplary embodiments.

Fourth Exemplary Embodiment

A construction vehicle according to yet another exemplary embodiment of the present invention will be hereinafter explained with reference to FIG. 11.

The aforementioned first to third exemplary embodiments have exemplified the controls of limiting the upper limit of the acceleration opening degree based on the magnitude of the vehicle speed and the magnitude of the travelling load. In the present invention, however, the control of limiting the upper limit of the acceleration opening degree is not limited to the above.

For example, the control of limiting the upper limit of the acceleration opening degree may be executed only based on the vehicle speed. The content of the control of the present exemplary embodiment will be hereinafter explained.

Figure 11:
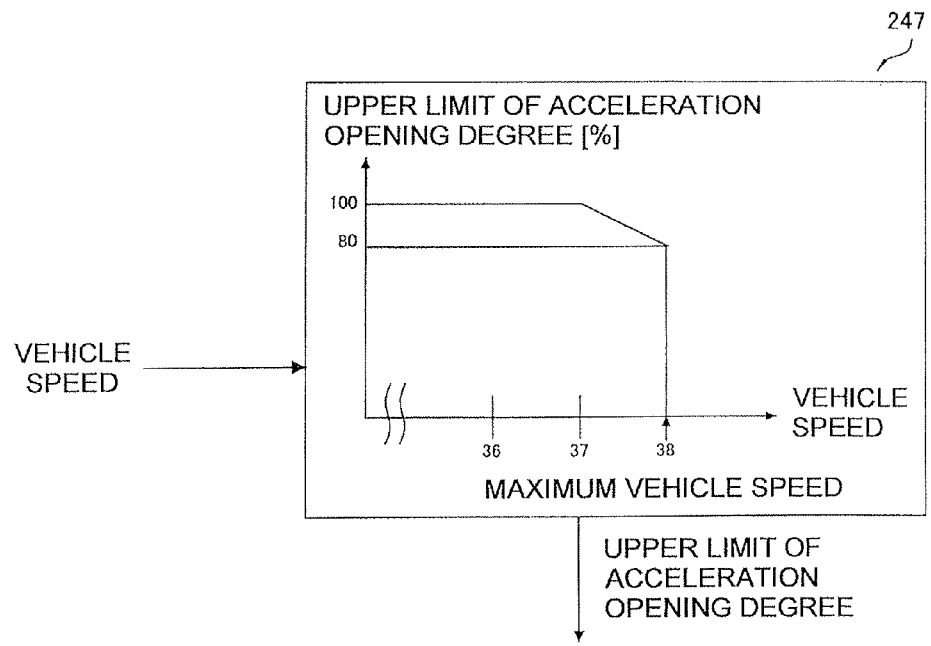
FIG. 11 is a control diagram representing the specific content of a processing to be executed in a control unit according to a fourth exemplary embodiment of the present invention.

In the present exemplary embodiment, only a signal indicating the vehicle speed is inputted into an acceleration opening degree upper limit setting section 247 as represented in FIG. 11. The acceleration opening degree upper limit setting section 247 preliminarily stores the correspondence between the vehicle speed and the upper limit of the acceleration opening degree. The amount of the acceleration opening degree to be limited by the acceleration opening degree upper limit setting section 247 is increased in proportion to increase in the vehicle speed towards the maximum vehicle speed (i.e., 38 km/h) while being reduced in proportion to reduction in the vehicle speed. When the vehicle speed reaches the maximum vehicle speed (i.e., 38 km/h), the acceleration opening degree is limited to 80% of the maximum opening degree. In other words, the engine speed is limited to 80% of the maximum engine speed when the vehicle speed reaches the maximum vehicle speed (i.e., 38 km/h) while the accelerator pedal 13a is fully pressed down.

It should be noted that the other components and configurations of the present exemplary embodiment are the same as those of the aforementioned first exemplary embodiment and explanation thereof will be thereby hereinafter omitted.

Next, the control to be executed by the control unit in the present exemplary embodiment will be hereinafter explained with reference to FIGS. 9(a) and 9(b).

First, as explained in the aforementioned first exemplary embodiment, the following relates to explanation of the control to be executed when the wheel loader travels at the highest vehicle speed on a flatland, i.e., when the accelerator pedal 13a is fully pressed down in the fourth speed range selected by an operator and the wheel loader stably travels constantly at around the maximum vehicle speed of 38 km/h on a flatland.

The travelling load is herein sufficiently small because the wheel loader travels stably on a flatland. The HST circuit pressure is thereby sufficiently small as well. Therefore, the vehicle body controller 12 reduces the displacement of the travelling hydraulic motor 10 to the minimum displacement (i.e., the lower limit of the displacement).

Further, the engine speed of the engine 1 is limited to 80% of the maximum engine speed (see FIG. 11) by the action of the control unit (i.e., the vehicle body controller 12 and the engine controller 12a) because the vehicle speed reaches 38 km/h. In other words, the control unit sets the regulation line R80 depicted in FIG. 9(a). In this case, the engine 1 is rotated at the engine speed Ng while producing the torque Tg where the point G is set as the matched point between the engine output and the travelling load.

As is obvious from FIG. 9(a), the present exemplary embodiment achieves a more improved fuel consumption rate than the well-known control.

Next, the following relates to explanation of the control to be executed when the wheel loader is accelerated to the maximum vehicle speed on a flatland, i.e., when the accelerator pedal 13a is fully pressed down in the fourth speed range selected by an operator and the wheel loader starts travelling on an upward slope during travelling at around the maximum vehicle speed of 38 km/h and the travelling load is thereby increased.

In this case, the HST circuit pressure is increased. Therefore, the displacement of the travelling hydraulic motor 10 is increased and the vehicle speed is reduced by the action of the command current calculating section 41 of the vehicle body controller 12.

Accordingly, the final acceleration opening degree becomes 100% without limitation on the upper limit thereof by the control unit.

As represented in FIG. 9(b), the engine 1 is herein rotated at the engine speed Nj while producing the torque Tj where the point J is set as the matching point between the engine output and the travelling load.

It should be noted that the control executed in the aforementioned first exemplary embodiment will be herein similarly executed when the wheel loader starts traveling on an upward slope during travelling at the maximum vehicle speed and explanation thereof will be thereby hereinafter omitted.

In the present exemplary embodiment, the upper limit of the acceleration opening degree is limited regardless of the magnitude of the travelling load when the vehicle speed gets closer to the vehicle speed limit (i.e., 38 km/h) as described above. Therefore, the acceleration performance is herein slightly inferior to that in the control of the aforementioned first exemplary embodiment under a high load until the vehicle speed reaches the maximum vehicle speed. Excluding this, however, the present exemplary embodiment can achieve the same advantageous effects as those of the aforementioned first exemplary embodiment.

Fifth Exemplary Embodiment

A construction vehicle according to yet another exemplary embodiment of the present invention will be hereinafter explained with reference to FIG. 12.

The aforementioned first to fourth exemplary embodiments have exemplified the cases that the acceleration opening degree upper limit setting section is configured to change the regulation line with respect to an arbitrary engine torque curve (see FIGS. 9(a) and 9(b)) for changing the engine speed. In the present invention, however, the method of changing the engine speed may not be limited to the above.

For example, it is possible to adopt a method of changing the engine speed by directly changing the torque curve based on the magnitude of the vehicle speed and the magnitude of the travelling load without providing the acceleration opening degree upper limit setting section. The following explanation relates to an exemplary embodiment related to the method.

Figure 12:
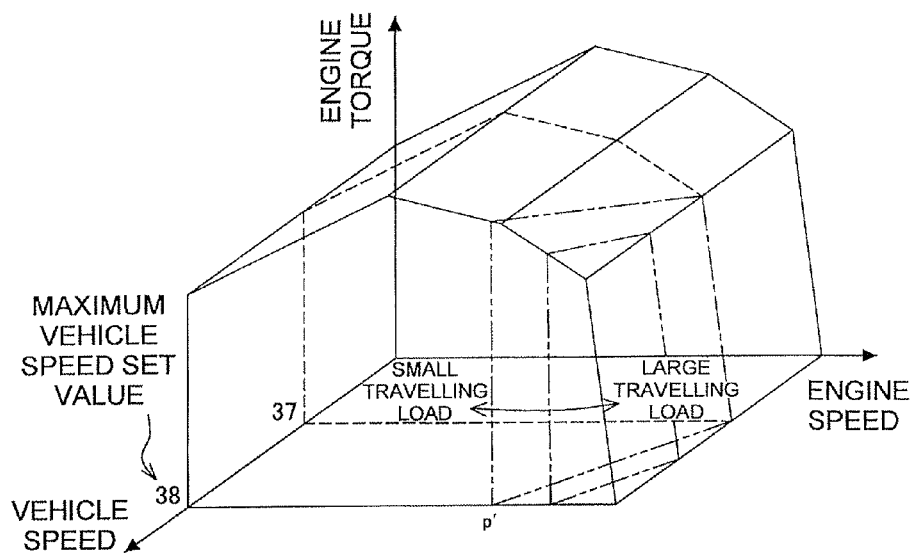
FIG. 12 is a chart representing an engine torque curve data related to the content of a control to be executed in a construction vehicle according to a fifth exemplary embodiment of the present invention.

In the present exemplary embodiment, the engine controller 12a preliminarily stores an engine torque curve depicted in FIG. 12. The torque curve has a characteristic that the maximum engine speed is reduced at around the maximum vehicle speed in proportion to reduction in a travelling load. Further, the torque curve has a characteristic that the extent of the maximum engine speed to be reduced in accordance with the travelling load is reduced in proportion to reduction in the vehicle speed from the maximum vehicle speed.

The engine controller 12a is configured to determine the fuel injection amount and control the engine based on the engine torque curve depicted in FIG. 12 using the acceleration opening degree commanded by the accelerator pedal, the travelling load and the vehicle speed.

In the present exemplary embodiment, the lower limit of the displacement of the travelling hydraulic motor 10 is set for achieving the maximum vehicle speed when the engine speed is reduced to 80% of the maximum engine speed, similarly to the aforementioned exemplary embodiments.

The present exemplary embodiment can achieve the same advantageous effects as those of the aforementioned exemplary embodiments.

Other Exemplary Embodiments

The exemplary embodiments of the present invention have been described above. However, the present invention is not limited to the aforementioned exemplary embodiments and a variety of changes can be herein made without departing from the scope of the present invention.

(A) The aforementioned exemplary embodiments have respectively exemplified the cases that the engine controller 12a and the vehicle body controller 12 are separately provided. In the present invention, however, the structure of the controllers may not be limited to the above.

For example, the engine controller and the vehicle body controller may be integrated as a single controller.

(B) The aforementioned exemplary embodiments have respectively exemplified the cases that the wheel loader 50 is provided with the HST system of 1-pump 1-motor type including the single hydraulic pump and the travelling hydraulic motor 10. In the present invention, however, the structure of the construction vehicle is not limited to the above.

Figure 13:
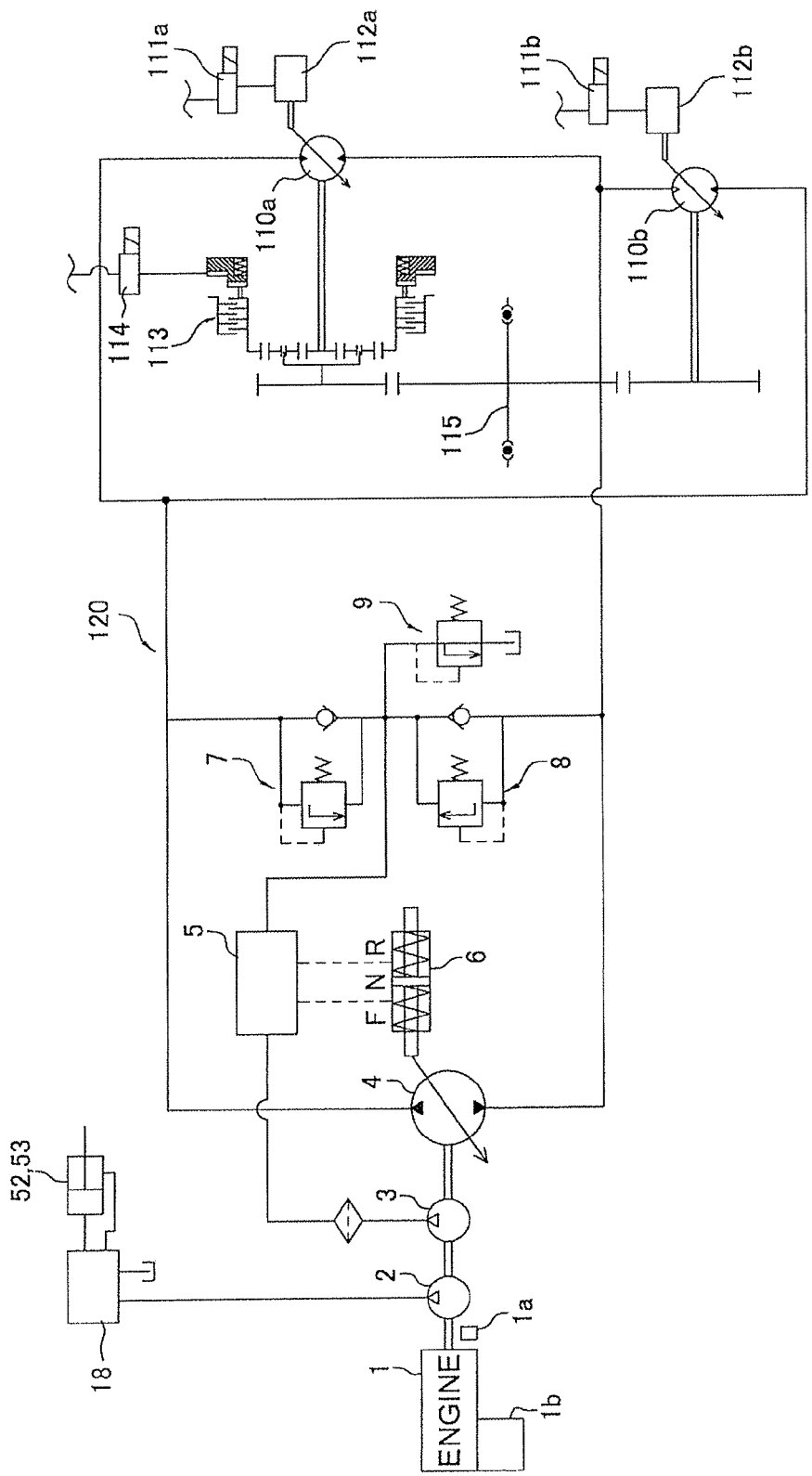
FIG. 13 is a hydraulic circuit diagram representing an HST system of a 1-pump 2-motors type mounted in a construction vehicle according to yet another exemplary embodiment of the present invention.

As represented in FIG. 13, for instance, the present invention may be applied to a construction vehicle provided with an HST system of 1-pump 2-motors type including two travelling hydraulic motors 110a and 110b, first and second motor controlling valves 111a and 111b, first and second motor cylinders 112a and 112b, a clutch 113, a clutch controlling valve 114, a driving shaft 115 and an HST circuit 120.

(C) The aforementioned exemplary embodiments have respectively exemplified the cases that the pressurized oil to be discharged from the charge pump 3 is supplied to the HST circuit 20 and the charge pump 3 functions as a source for supplying the pilot pressure in order to control the pump displacement control cylinder 6. In the present invention, however, the structure of supplying the pressurized oil and the pilot pressure is not limited to the above.

For example, the working unit controlling hydraulic circuit to be connected to the working unit and the steering pump may be provided with a priority valve for dividing the flow of the pressurized oil. The divided pressurized oil may be supplied to the HST circuit 20. Further, the pilot pressure may be produced using the divided pressurized oil for controlling the pump displacement control cylinder 6.

(D) The aforementioned fifth exemplary embodiment have exemplified the case that the engine torque curve, stored in the engine controller 12a, has a characteristic that the maximum engine speed is reduced in proportion to both reduction in a travelling load and increase in the vehicle speed towards the maximum vehicle speed at around the maximum vehicle speed. In the present invention, however, the characteristic of the engine torque curve is not limited to the above.

For example, the engine torque curve may have a characteristic that the maximum engine speed is reduced at around the maximum vehicle speed in proportion to increase in the vehicle speed towards the maximum vehicle speed regardless of the magnitude of the travelling load.

In this case, it is possible to achieve the same advantageous effects as those of the aforementioned fourth exemplary embodiment.

(E) The aforementioned exemplary embodiments have respectively exemplified the cases that the lower limit of the displacement of the travelling hydraulic motor 10 is set to be a constant value. In the present invention, however, the lower limit of the displacement of the hydraulic motor is not limited to the above.

For example, an operator may be allowed to change the lower limit of the displacement of the travelling hydraulic motor as described in Japan Laid-open Patent Application Publication No. JP-A-2004-144254.

(F) The aforementioned exemplary embodiments have respectively exemplified the cases that the aforementioned lower limit of the displacement of the travelling hydraulic motor 10 is set during travelling of the wheel loader 50 in the fourth speed range as the maximum speed range. In the present invention, however, the setting of the lower limit of the displacement of the hydraulic motor is not limited to the above.

For example, the aforementioned control may be executed during travelling in the maximum speed range when the transmission mechanism of the construction vehicle has three or less speed ranges, or alternatively, five or more speed ranges.

Alternatively, the aforementioned control may be executed in the other situations excluding travelling in the maximum vehicle speed range, such as travelling without using the working unit at all or travelling with using the working unit at a low load.

(G) The aforementioned exemplary embodiments have respectively exemplified the cases that the present invention is applied to the wheel loader as the construction vehicle. In the present invention, however, the construction vehicle is not limited to the wheel loader.

For example, the present invention can be applied to any other construction vehicles provided with the HST.

The construction vehicle of the above illustrated embodiments can achieve an advantageous effect that it can travel at the maximum vehicle speed while inhibiting the fuel consumption thereof, for instance, during travelling on a flatland with a small travelling load. Further, the construction vehicle of the above illustrated embodiments can achieve an advantageous effect that it can smoothly reach the maximum vehicle speed under a large travelling load, for instance, during travelling on an upward slope. Therefore, the present invention can be widely applicable to a variety of construction vehicles including an HST.

The invention claimed is:
1. A construction vehicle comprising:
an engine;
a hydraulic pump for travelling configured to be driven by the engine;

an accelerator pedal configured to adjust an acceleration opening degree in accordance with a pressed amount thereof;

a hydraulic motor for travelling configured to be driven by a pressurized oil discharged from the hydraulic pump for travelling;

a travelling load detecting section configured to detect a magnitude of a travelling load applied in travelling;

a vehicle speed detecting section configured to detect a vehicle speed; and a control unit configured to set an upper limit of a command value of the acceleration opening degree in accordance with the magnitude of the travelling load and a magnitude of the vehicle speed, the control unit being further configured to set a lower limit of a displacement of the hydraulic motor for travelling in order to maximize the vehicle speed at the acceleration opening degree limited to a predetermined amount.

2. A construction vehicle comprising:

an engine;

a hydraulic pump for travelling configured to be driven by the engine;

an accelerator pedal configured to adjust an acceleration opening degree in accordance with a pressed amount thereof;

a hydraulic motor for travelling configured to be driven by a pressurized oil discharged from the hydraulic pump for travelling;

a vehicle speed detecting section configured to detect a vehicle speed;

a storage section configured to store engine torque curve data having a characteristic that an engine speed is reduced in proportion to increase in the vehicle speed towards a maximum vehicle speed; and a control unit configured to control the engine based on the engine torque curve data in accordance with a magnitude of the vehicle speed, the control unit being further configured to set a lower limit of a displacement of the hydraulic motor for travelling in order to maximize the vehicle speed at the acceleration opening degree limited to a predetermined amount.

3. The construction vehicle recited in claim 2, further comprising:

a travelling load detecting section configured to detect a magnitude of a travelling load to be applied in travelling, wherein the engine torque curve data further has a characteristic that the engine speed is reduced in proportion to reduction in the travelling load, and the control unit is configured to control the engine based on the engine torque curve data in accordance with the magnitude of the travelling load, the control unit being further configured to set the lower limit of the displacement of the hydraulic motor for travelling in order to maximize the vehicle speed at the acceleration opening degree limited to the predetermined amount.

4. The construction vehicle recited in claim 1, wherein the travelling load is a hydraulic pressure of the pressurized oil to be supplied to the hydraulic motor for travelling.

5. The construction vehicle recited in claim 1, wherein the travelling load is an output torque of the engine.

6. The construction vehicle recited in claim 1, wherein the travelling load is a product of a hydraulic pressure of the pressurized oil to be supplied to the hydraulic motor for travelling and the displacement of the hydraulic motor for travelling.

7. The construction vehicle recited in claim 3, wherein the travelling load is a hydraulic pressure of the pressurized oil to be supplied to the hydraulic motor for travelling.

8. The construction vehicle recited in claim 3, wherein the travelling load is an output torque of the engine.

9. The construction vehicle recited in claim 3, wherein the travelling load is a product of a hydraulic pressure of the pressurized oil to be supplied to the hydraulic motor for travelling and the displacement of the hydraulic motor for travelling.

* * * * *